United States Patent [19]
Dagerford

[11] 3,743,009
[45] July 3, 1973

[54] AIR CONDITIONING AND HEATING CONTROL SYSTEM INCLUDING CONTROL PANEL

[75] Inventor: Ernest C. Dagerford, Irvine, Calif.

[73] Assignee: BEC Products, Inc., Davenport, Iowa

[22] Filed: June 23, 1971

[21] Appl. No.: 155,826

[52] U.S. Cl. .................... 165/11, 165/26, 236/44 C, 236/94
[51] Int. Cl. ............................................. F25b 29/00
[58] Field of Search ................ 165/11, 26; 340/213, 340/213.1, 412, 417, 227; 431/14

[56] References Cited
UNITED STATES PATENTS

| | | | |
|---|---|---|---|
| 3,136,982 | 6/1964 | Sargent | 340/213.1 |
| 2,730,704 | 1/1956 | Warren | 340/213.1 |
| 3,345,628 | 10/1967 | Jackson | 340/213 R X |
| 3,068,450 | 12/1962 | Fletcher et al. | 340/213.1 X |
| 3,234,534 | 2/1966 | Todman | 340/213 R |

FOREIGN PATENTS OR APPLICATIONS

| | | | |
|---|---|---|---|
| 728,302 | 4/1955 | Great Britain | 431/14 |

Primary Examiner—William F. O'Dea
Assistant Examiner—William C. Anderson
Attorney—Smyth, Roston & Pavitt

[57] ABSTRACT

A control system for use in monitoring the operation of a plurality of pieces of equipment such as equipment used in an air conditioning and heating system and including a control panel having a plurality of output indicators arranged in rows and columns and with first ones of the indicators providing indication that individual ones of the pieces of equipment are in an operative state and with others of the indicators providing an indication of a malfunction in the operation of individual ones of the pieces of equipment and with means coupled to the equipment and to the indicators for providing for the first ones of the indicators to be in an operative state when individual ones of the equipment are in an operative state and for the others of the indicators to be in an operative state when malfunctions exist in the operation of the individual pieces of equipment and wherein the indicators are formed in a matrix having the first ones of the indicators along a first line and the others of the indicators arranged along parallel lines perpendicular to the first line and with the indicators along the parallel lines relating to malfunctions in the equipment indicated to be in an operative state by the indicators located at the interceptions of the first line and the parallel lines perpendicular to the first line.

22 Claims, 3 Drawing Figures

AIR CONDITIONING AND HEATING CONTROL SYSTEM INCLUDING CONTROL PANEL

The present invention is directed to a control system for use in monitoring the operation of and malfunctions in a plurality of pieces of equipment. Specifically, the invention relates to a control system for use in an air conditioning and heating system.

In a conventional air conditioning and heating system a plurality of pieces of equipment are used to provide for heating, cooling, humidification and dehumidification for a given area. For example, a thermostat controls the equipment to either produce heat or cooling in accordance with the temperature in the given area versus the desired temperature for that given area. The humidity in the given area may also be sensed and with humidification or dehumidification provided in accordance with the humidity in the area relative to the desired humidity in the given area. In many instances all of these various functions are provided by separate controls located in separate locations and it is difficult to ascertain in which state the air conditioning and heating system is operating and what particular functions are being provided at any particular time.

In any system with the complexity of a sophisticated air conditioning and heating system, malfunctions are bound to occur. It is common practice to monitor some of these malfunctions and to provide for equipment to be placed in an inoperative state when such a malfunction exists. At this time it is necessary to call for a service man who must examine the complete system to determine where the malfunction has occurred. This can be expensive and moreover can be time consuming which is of primary importance in the use of such air conditioning and heating systems for situations where it is imperative that the proper climatic conditions be maintained. For example, in computer rooms it is very important that the climatic conditions in the room be maintained accurately and that there be no hiatus in the operation of the equipment to provide such climatic conditions.

The present invention provides for a control system for an air conditioning and heating system including a central control panel wherein the control panel includes controllers for controlling the entire operation of the air conditioning and heating system. For example, mounted on the control panel are controllers to control the application of power to the air conditioning and heating system and controllers to set the desired temperature and humidity for the given area. In addition to the controllers, the control panel includes a plurality of first indicators which indicators provide an indication of a demand for the operation of the individual pieces of equipment so that it is possible to observe whether heating or cooling is being supplied or should be supplied to the given area. These first indicators may also provide for an indication of a demand for humidification or dehumidification. The control panel also includes a plurality of second indicators which indicate when a malfunction exists in individual pieces of equipment for providing the heating, cooling, humidification and dehumidification. In addition, auxiliary indicators may be used to indicate other malfunctions in the air conditioning and heating system.

In order to provide for a rapid observation of the control panel the panel is designed so that the various indicators form a matrix and with a first row in the matrix relating to the basic supply of power from the line, the supply of power to the control system, and the individual pieces of equipment plus the supply of power to any auxiliary equipment needed for operation of the air conditioning and heating system. A second row of indicators provide indication of the particular function which is in demand and the specific piece of equipment which is providing this function. For example, these indicators relate to whether heat, cooling, humidification and dehumidification is in demand and is to be supplied. A third group of rows of indicators provide for indications of malfunctions in the particular pieces of equipment which are supplying the particular demand and generally the indicators relating to malfunctions in particular pieces of equipment are arranged in columns including the indicator which indicates that a particular piece of equipment is in demand.

Since the control panel has indicators arranged in a logical order it is possible to scan the control panel and in a very short order of time have a complete picture of the operation of the air conditioning and heating system at any particular instant and an indication as to whether a malfunction exists in the system and in which piece of equipment such malfunction exists. Also, in some instances the indicators may indicate the specific malfunction.

In order to call attention to the fact that a malfunction does exist, the control system of the present invention also includes an audible alarm which provides for an audible signal when any of the indicators indicate that a malfunction exists in the system. The control panel may include an alarm silencer to deactivate the audible alarm after such audible alarm has sounded but with the alarm silencer not affecting the operation of the malfunction indicators. The control panel may also include a controller which activates all of the indicators so that it is possible to very quickly see if any of the indicator lights is inoperative.

It may therefore be seen that the present invention provides for a central control panel and control system so that the operation of an air conditioning and heating system may be very accurately monitored. A clearer understanding of the invention will be had with reference to the following description of the drawings wherein:

FIG. 2b provides for the remaining portion of the schematic of FIG. 2a.

Figure 1:
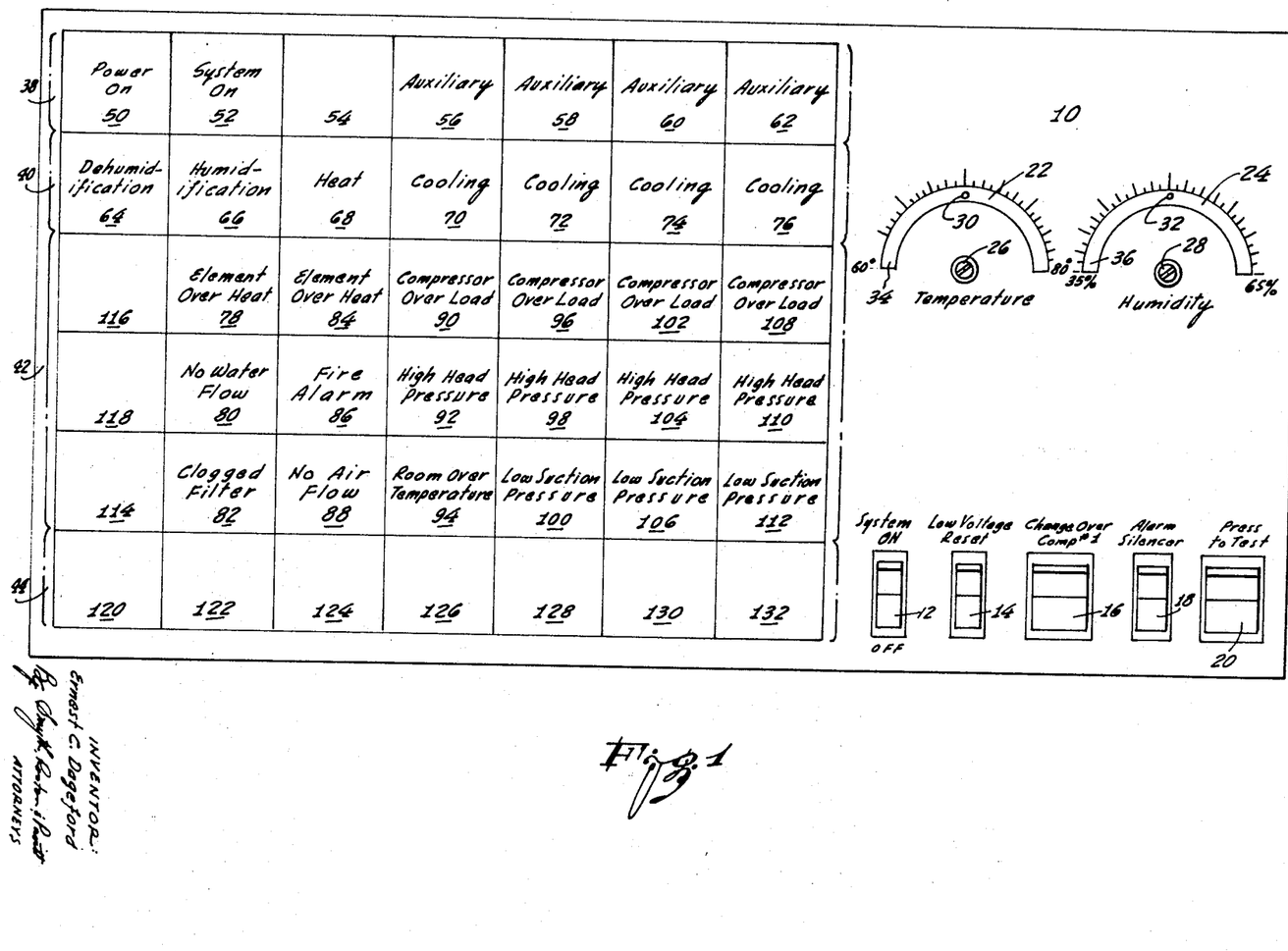
FIG. 1 illustrates a front view of the control panel of the present invention.
Figure 2A:
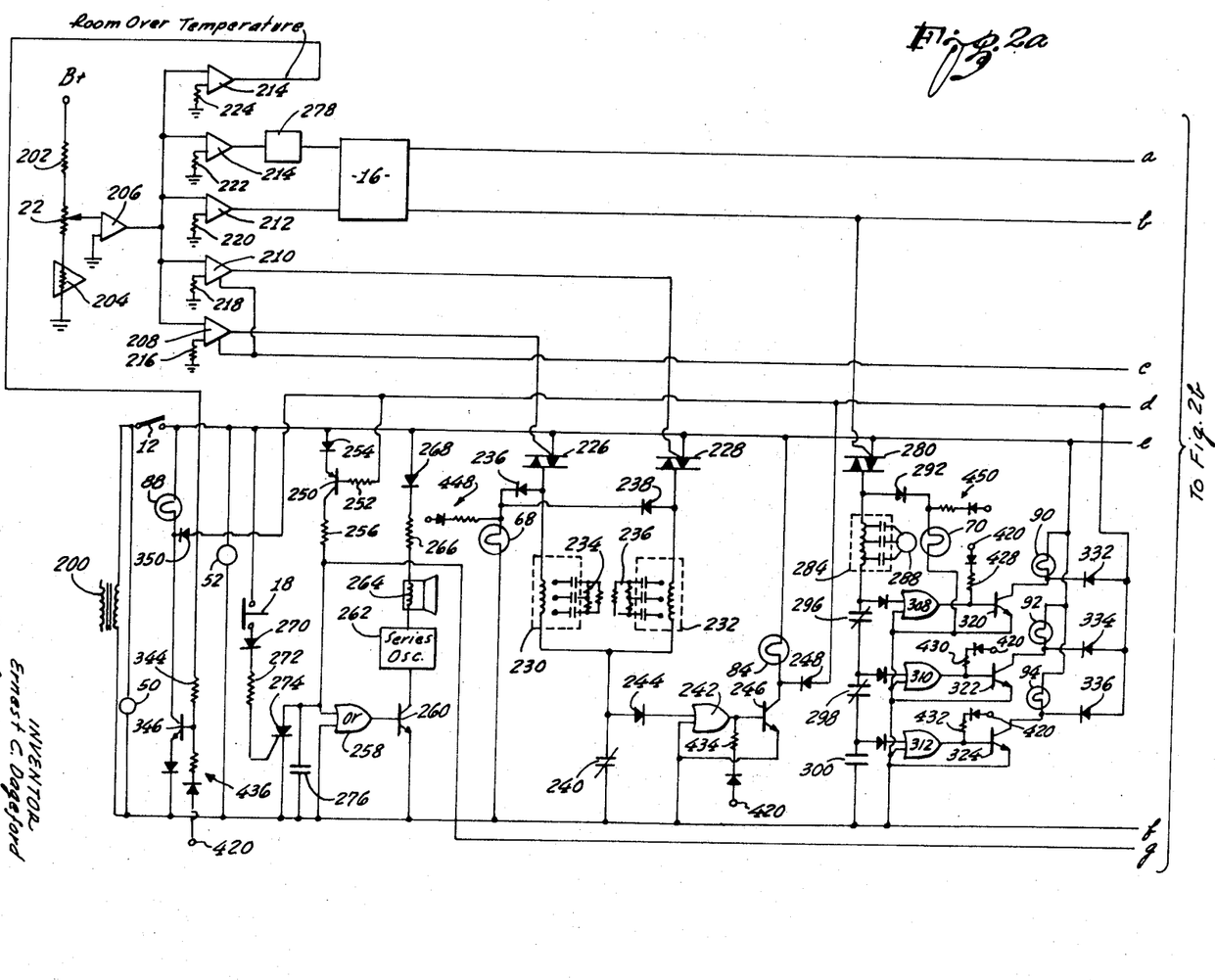
FIG. 2a illustrates a first portion of a schematic of a control system which provides for the control of an air conditioning and heating system and provides for the various controls and indications of the control panel of FIG. 1.
Figure 2B:
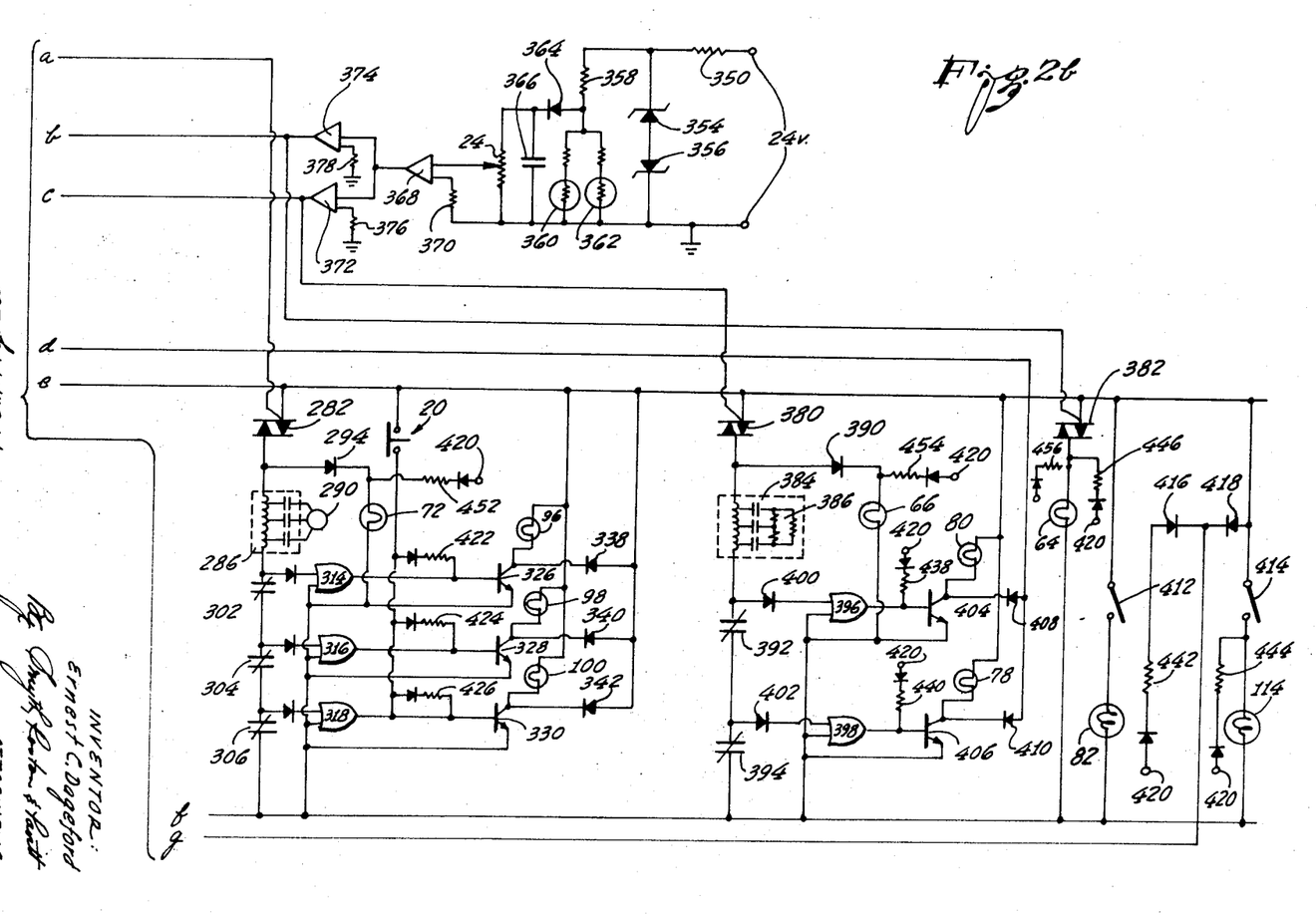

In FIG. 1 the control panel 10 includes a plurality of control switches 12 through 20 located in the lower right-hand portion of the panel 10. The switches 12 through 20 may provide the following functions: Switch 12 may be a system on-off control; switch 14 may be a low voltage reset control; switch 16 may be a changeover control between a No. 1 compressor and a No. 2 compressor; switch 18 may be an alarm silencer control and switch 20 may be a press-to-test control. The specific operation of the switches with the exception of the switch 14 which is optional, will be seen with more clarity when the schematic of the FIG. 2a and 2b is examined in detail.

The control panel 10 also includes a pair of setting controls 22 and 24. The setting control 22 may be for setting the desired temperature for the given area which is controlled by the air conditioning and heating system and the setting control 24 is for humidity. The setting controls 22 and 24 may be adjusted using a screwdriver in the screws 26 and 28. An indicator dot 30 may be used with the setting control 22 and an indicator dot 32 may be used with the setting control 24. The setting controls 22 and 24 may have an illuminated portion 34 and 36 so as to more clearly show the indicator dots 30 and 32.

The panel 10 may be of a translucent material which is masked off except for particular areas and these areas may be illuminated by small bulbs placed behind the control panel 10. The areas 34 and 36, for example, may be translucent and may even have a particular color such as blue so that the illumination through the control panel 10 in the areas 34 and 36 appear blue so as to highlight the indicator dots 30 and 32. The setting controls 22 and 24 may actually be potentiometers as will be seen with reference to the schematic of FIGS. 2a and 2b. The setting dots 30 and 32 may therefore merely be a member which rides along with the arm of the potentiometers forming the setting controls 22 and 24.

The left-hand indicator portion of the control panel includes a plurality of indicators. These indicators may be provided by individual lights behind the panel which provide for light energy directed to and through colored portions of the panel which also include writing. The indicator portion may be subdivided into four sections, 38, 40, 42, and 44. Each section may have a different color so as to differentiate the function of each section. Specifically, the indicators are arranged in a matrix of rows and columns and with the sections 38, 40, and 44 each being a single row and the section 42 including three rows of indicators.

The section 38 includes a plurality of indicators representing the supply of power to various portions of the air conditioning control and heating system. For example, indicator 50 represents the supply of power from the line, and indicator 52 represents the supply of power to the control system. Indicator 54 may be a spare, and indicators 56, 58, 60, and 62 may represent the supply of power to auxiliary equipment. Specifically, the auxiliary equipment may be support equipment used with the air conditioner equipment such as the condenser fan, chilled water supply, etc. These auxiliary indicators 56 through 62 may be operated in conjunction with the turning on of those particular pieces of equipment.

The second section 40 of indicators consisting of a single row of indicators may have a color different from the first section 38. The second row of indicators provide indication that there is a demand called for in the air conditioning and heating system and specifically which function is called for and which piece of equipment is providing this function. For example, the second section 40 may include indicators 64 and 66 which provide indication that the system should be providing either dehumidification or humidification. An indicator 68 provides an indication that the system should be providing heat. Indicators 70 through 76 provide indication that the system should be providing cooling.

The third section of indicators 42 may have a different color than the sections 38 and 40. The third section of indicators 42 include three rows and provides indications of particular malfunctions in the system and malfunctions of individual pieces of equipment in the system. Generally, the indicators in the section 42 are arranged in columns below indicators in the section 40 and in most cases all of the indicators in a column relate to malfunctions in the equipment which should be operating as indicated by the indicators in the section 40. Specifically, the indicators 78, 80, and 82 relate to a particular malfunction which may occur when the equipment should be providing humidification. Indicator 78 indicates that the heating element used in the humidification is over temperature. Indicator 80 indicates that there is no water flow to the heating element which is used in the humidification and indicator 82 indicates that there is no air flow to the humidifier.

Indicator 84 may be used to indicate a malfunction in the heating operation and specifically indicator 84 may indicate that the element used in the heating operation is over temperature. In the same column with the indicators 68 and 84, indicators 86 and 88 may be used to provide other optional malfunctions which relate to over temperature conditions. For example, indicator 86 may be a fire alarm indicator to indicate that the temperature in the given area has reached a sufficiently high level to represent that a fire condition exists. Indicator 88 may be used to represent the condition when the room had not reached a fire condition but is in an over temperature situation. When such over temperature situation is indicated by indicator 88, it may be appreciated that a check of the air conditioning system may be had since the indicators 70 through 76 should be showing cooling to correct this over temperature situation.

The indicators 90, 92, and 94 all relate to malfunctions in the equipment providing the first stage of cooling, which cooling is represented by the indicator 70. For example, indicator 90 may represent that the compressor used in the first stage of cooling is overloaded. Indicator 92 may indicate a high head pressure in the compressor and indicator 94 may represent that there is a low suction pressure in the input to the compressor. Indicators 96, 98, and 100 represent similar malfunctions in the second stage of cooling which is indicated to be in demand by the indicator 72.

If the air conditioning system includes, in addition to the two stages of cooling, third and fourth stages of cooling, these may be shown to be in demand by indicators 74 and 76. Additional indicators 102 through 112 may be provided to monitor the various malfunctions in the third and fourth stages of cooling in the same manner as indicators 90, 92, and 94 associated with the first stage of cooling.

The section 42 may also include an indicator 114 which is responsive to a clogged filter in the air supply to the air conditioning and heating system. In addition, indicators 116 and 118 which are shown to be blank are provided and such indicators are spares that may be used to monitor other malfunctions in the system. In addition to the spares 116 and 118, a row of spare indicators 120 through 132 forming the section 44 is shown, which spares may be used to monitor other malfunctions in the system or may be used for other indicator purposes.

It can be seen from a study of the control panel 10 of FIG. 1 that the control panel provides a central location for all of the necessary controllers and indicators to provide for complete control of the air conditioning and heating system and for monitoring the operations of and malfunctions in such air conditioning and heating system. The temperature and humidity conditions may be set after the system has been turned on and with the power from the line and the power to the system monitored by indicators 50 and 52. Power to auxiliary equipment is monitored by auxiliary indicators 56 through 62. If the conditions in the given area are such that a particular demand is made on the air conditioning and heating system, such demand representing the function which is to be occurring and the equipment which is providing that function, is shown by the indicator section 40 including the indicators 64 through 76. If any malfunctions occur in the air conditioning and heating system, in particular pieces of equipment of the air conditioning and heating system, or in the given area, such malfunctions are shown by indicator section 42 including indicators 78 through 118. A number of spares are provided within the sections 38 and 42 and an entire row of spares is provided by section 44.

A clearer understanding of the operation of the control circuit will be had with reference to the schematic shown in FIGS. 2a and 2b, and with these figures interrelated through the lines a through g of FIG. 2a, which lines are common with lines a through g of FIG. 2b. In FIG. 2a the line voltage is passed through a step-down transformer 200 to provide a voltage such as 24 volts a-c between a common line and one terminal of the switch 12. When the line voltage is present the indicator 50 represents that power is present from the line. The switch 12 may be closed to provide power to the control system. When the switch 12 is closed the indicator 52 comes on to indicate that power is applied to the system.

The setting controls which are the potentiometers 22 and 24 provide for the desired setting of the temperature and humidity in the given area from the air conditioning and heating system. The potentiometer 22 is in series with a pair of resistors 202 and 204 to form a voltage divider and with the voltage divider connected between a d-c voltage and a reference potential such as ground. The d-c voltage may be a voltage developed from the a-c input voltage.

The resistor 204 is a temperature-sensitive resistor, such as a thermistor, which temperature-sensitive resistor is placed in the given area which is climatically controlled by the air conditioning and heating system. As the temperature in that given area changes, the resistance of the thermistor 204 also changes, thereby changing the voltage at the arm of the potentiometer 22. It can be seen therefore, that by varying the position of the arm of the potentiometer 22, a setting adjustment may be made between the voltage from the arm so as to control the signal from the potentiometer to provide a voltage signal in accordance with the difference between the actual temperature in the given area and the desired temperature.

The output signal from the potentiometer 22 is coupled through a buffer amplifier 206 to a plurality of differential comparators 208 through 214. The output from the buffer amplifier 206 forms one input to the differential comparators 208 through 214 and a plurality of resistors 216 through 224 coupled to ground to provide the reference levels to the differential comparators. The differential comparators 208 through 214 are used to provide a plurality of control signals which are in accordance with the signal from the potentiometer 22. Specifically, the comparators 208 and 210 are used to provide control for two stages of heating when the temperature in the given area is sensed by the thermistor 204 to be below the desired temperature. The comparators 212 and 214 are used to provide two stages of cooling when the temperature in the given area is sensed by the thermistor 204 to be above the desired temperature and the comparator 214 is used to produce a control signal representing a room over temperature when the temperature in the given area as sensed by the thermistor 204 is considerably above the desired temperature. The comparators 208 through 214 may be substantially identical in design with the various control points adjusted in accordance with the value of the resistors 216 through 224.

The output from the comparators 208 abd 210 are used to control a pair of Triacs 226 and 228 which in turn are used to control the application of the a-c power to a pair of three-phase a-c contactors 230 and 232. The a-c contactors 230 and 232 in turn control the power through the heaters represented by the sets of resistors 234 and 236. When the temperature in the given area is below the desired temperature as represented by the resistance value of the thermistor 204, the comparator 208 may produce a first control signal to control the Triac 226 to provide power to the heaters 234. When this occurs a current path is also established through the diode 236 so that the indicator light 68 is placed in an operative state to produce a visual indication on the control panel 10 shown in FIG. 1. When the light 68 is on, it indicates that there has been a demand for heat and that the heaters have been placed in an operative state.

If the temperature in the given area is considerably below the desired value the comparator 210 may also produce a control signal to provide control of the Triac 228 so that power is supplied to the heaters 236. At this time a current path is supplied through the diode 238 to the indicator light 68. It may be desirable to vary the use of the heaters 236 and 238 by occasionally switching the control signals so that one of the heaters is not used more often than the other. It is also possible to have an additional indicator light in addition to the light 68 so that both stages of heating may be shown on the control panel.

When either or both of the heaters 234 and 236 have a malfunction this may provide for an over temperature condition to exist in either or both of the heaters 234 and 236. At this time, an overload switch 240 senses this over temperature condition. For example, the overload switch 240 may be a bimetallic element which is positioned adjacent to the heaters to sense such an over temperature condition of the heaters. The overload switch 240 is normally closed so that the current through the a-c contactors 230 and 232 passes to ground. When the switch 240 is closed there will be no input to the OR gate 242 through the diode 244. However, when an overload condition occurs and the switch 240 opens, a signal is produced from the OR gate 242 so as to control a transistor 246 to be on. When the transistor 246 is on, this supplies current to the indicator light 84 to indicate that an over temperature condition occurs for the heater elements 234 or 236.

In addition to the indicator light 84 providing a visual indication that a malfunction exists, a ground signal through the diode 248 is provided at the base of a transistor 250 through a resistor 252. When the base of the transistor 250 is grounded, the transistor 250 is turned on. When the transistor 250 is on, a current path is provided through the diode 254, the transistor 250 and a resistor 256 to produce an input signal to an OR gate 258. It can be seen therefore, that when the transistor 250 is on, a signal is coupled through the OR gate 258 to a transistor 260. The transistor 260 controls a horn driver 262 which horn driver may be an oscillator in series with an audible alarm 264. The alarm circuit is completed by the resistor 266 and diode 268. It can be seen therefore, that when a fault occurs, not only is there a visual indication, but also there is an audible indication through the use of the horn 264. This audible indication occurs when any malfunction occurs in the system as will be seen with reference to the remaining portion of the schematic of FIGS. 2a and 2b.

Since the audible alarm could be very annoying while the malfunction is being corrected, it is desirable to provide for a means to silence the alarm without affecting the visual indicators. An alarm silencer, using the switch 18, provides for a signal to be coupled through a diode 270 and resistor 272 to a silicon controlled rectifier 274. A capacitor 276 is connected across the silicon controlled rectifier. When the switch 18 is pushed, this controls the silicon controlled rectifier to ground the OR gate to turn off the horn. The silicon controlled rectifier will be maintained by its own holding current, even after the switch 18 is deactivated.

The output signals from the comparators 212 and 214 are treated similarly to those from the comparators 208 and 210 except that the comparators 212 and 214 produce signals representing a demand for cooling. In order to insure that both portions of the cooling system are not turned on at the same time, since the simultaneous activation of the two compressors would be a strain on the power system, a time delay 278 is used. This time delay may be for a period such as three seconds. Therefore, if the temperature in a given area, as determined by the thermistor 204, is so high that a demand is required for both stages of cooling, the signal from the comparator 214 will be delayed for a period of at least three seconds before the second compressor is activated. In addition to the time delay 278, a changeover switch 216 is used to control the output signals from the comparators 212 and 214 so that the activation of the compressors may be reversed. The changeover switch 16 may therefore be switched periodically so that the compressors may have an equal life.

The output signals from the switch 16 are applied to a pair of Triacs 280 and 282. Triac 280 appears in FIG. 2a and Triac 282 appears in FIG. 2b. The Triacs control the application of power to a-c contactors 284 and 286. The a-c contactors 284 and 286 may be three-phase contactors to control the application of power to the compressor motors 288 and 290. When there is a demand for cooling, as indicated by output signals from the comparators 212 and 214, the Triacs 280 and 282 may be turned on to turn on the compressor motors 288 and 290. At the same time, a current flow is produced through the indicator lights 70 and 72 using diodes 292 and 294.

The malfunctions of the compressors may be sensed using a plurality of sensing switches 296, 298 and 300 for the compressor 288 and switches 302 and 304 and 306 for compressor 290. The switches 296 through 306 are normally closed and sense the following conditions.

The switches 296 and 302 are used to sense an over current condition in the compressors and the switches open when the current is above a certain predetermined value. The switches 298 and 304 are positioned to sense the head pressure in the compressor and when the head pressure exceeds a predetermined level, the switches 298 and 304 open. Finally, the switches 300 and 306 are used to sense the suction pressure at the intake of the compressor and when this suction pressure falls below a certain value, the switches 300 and 306 may open.

When any of the switches 296 through 306 open, this produces input signals to the OR gates 308 through 318. The output of the OR gates are individually coupled to transistors 220 through 330 and with each of the transistors turned on in accordance with a signal from an OR gate which in turn is controlled by the individual switches 296 through 306. The individual lights 90 through 100 are controlled by the transistors 320 through 330 so that the control panel 10 provides for visual indications as to the particular malfunction of the compressors 288 and 290. This allows an operator of the system to very quickly determine the particular malfunction that may exist in the air conditioning system. Although the schematic of FIGS. 2a and 2b shows two stages of cooling, it is obvious that additional stages may be provided for by using similar circuitry so as to provide indications of the operation of and malfunctions in stages three and four of cooling which are shown on the control panel 10.

When any of the transistors 320 and 330 are turned on, the base of the transistor 250 is grounded through the diodes 332 through 342 so as to provide for the audible alarm 264 to be turned on in a similar manner as that described above with reference to the over temperature malfunction in the heating operation.

The final differential comparator coupled from the amplifier 206 is the differential comparator 214 which monitors a room over temperature condition. When the room is in an over temperature condition, an output signal is produced from the differential comparator 214 and which output signal is coupled through a current limiting resistor 344 to the base of the transistor 346. The transistor 346 is turned on to cause current to flow through the room over temperature light 88 which is in series with the transistor 346 and a resistor 348. The audible alarm 264 is also activated when the transistor 346 is turned on through the use of the diode 350 which provides for a grounding of the base of the transistor 250.

Turning now to FIG. 2b, the voltage at the switch 12 may also be applied through a current limiting resistor 352 to a pair of back-to-back Zener diodes 354 and 356 which serves as an a-c regulator. The regulated voltage is applied to a voltage divider including the resistor 358 and a pair of resistors 360 and 362 which are solid state humidity sensors. The humidity sensors 360 and 362 provide for variations in resistance in accordance with the humidity of the room. Two of the sensors are used so as to increase the range. The output from the voltage divider therefore varies in accordance with the humidity of the room. The output signal from the voltage divider passes through the diode 364 to rectify the signal and such rectified signal is then filtered by capacitor 366. The signal is then impressed on the potentiometer 24 and as indicated above, the arm of the potentiometer may be adjusted so as to set the desired humidity for the given area.

The control signal from the potentiometer 24 is coupled through a buffer amplifier 368 which includes a resistor 370 and the output of the buffer amplifier is coupled to a pair of differential comparators 372 and 374. The level at which the differential comparators operate may be adjusted using different values for resistors 376 and 378. The output of the differential comparators, therefore, determines whether the humidity in the given area is above or below a desired level as set by the arm of the potentiometer 24 and with the system providing for humidification when the level is below the desired level and providing for dehumidifization when the level is above the desired level.

The output signals from the differential comparator 372 and 374 are used to control a pair of Triacs 380 and 382. The Triac 380 controls the application of power to a three-phase a-c contactor 384 which supplies current to a heater 386 submersed in a flow of water 388. A flow of air above the heater water produces moist air which is allowed to enter the given area so as to provide for humidification. At the same time the a-c contactor 384 is energized, the indicator light 66 is energized through the diode 390 so as to provide an indication that humidification is taking place.

The humidification system also provides for the sensing of two types of malfunctions in the humidification cycle. First, there is a normally closed switch 392 that senses the water flow 388 to the heater 386 and when the water flow is below a particular value, the switch 392 will open. There is a second switch 394 which senses the temperature of the heater 386 and when such temperature is above a predetermined level, the switch 394 opens. When the switches 392 or 394 open, output signals are coupled to OR gates 396 and 398 through diodes 400 and 402. The output signals from the OR gates 396 or 398 are used to control transistors 404 and 406 which provide visual indication, through the indicator light 78 and 80, that there is an element over heating or that there is no water flow. These indications are provided on the control panel 10 in FIG. 1.

At the same time there is a visual indication, using the indicators 78 and 80, there is also an audible indication through the use of grounding signals coupled through the diodes 408 and 410 which grounding signals are coupled to the base of the transistor 250. In order to insure that during the period of humidification that warm dry air is not produced by the heaters 234 and 236 shown in FIG. 2a, the output signal from the differential comparators 372 is also coupled to the comparators 208 and 210 so as to inhibit these comparators. This insures that the humidification system is not working against the provision of dry air by the heater system.

During the dehumidification cycle the output signal from the differential amplifier 374 is coupled to the Triac 382 so as to turn on the dehumidification light 64. At the same time the output signal from the differential comparator 374 is coupled to the first stage of the cooling system and specifically to the compressor 288 so as to provide for the introduction of cool air into the air conditioning and heating system. This normally provides for a dehumidification since the cool air provides for a condensation of excess moisture in the air.

The system of FIGS. 2a and 2b also includes a monitoring of the air flow into the system by a vane switch 412. Normally the switch is in an open position but when the supply of air to the system is below a certain level, the vane switch 412 closes, thereby providing for a visual indication through the use of the indicator 82. A differential pressure switch 414 may also be used to monitor the condition of the filters that are used in the air supply. When the filters become sufficiently clogged so that the differential pressure between the front and back of the filters increases significantly, the switch 414 closes to provide for a visual indication from the indicator 114.

The closing of either of the switches 412 and 414 also provides for an audible alarm through the use of the signals coupled through diodes 416 and 418 which are coupled directly to the OR gate 258 shown in FIG. 2a. This provides for the activation of the transistor 260 which in turn operates the horn driver 262 to provide for an audible alarm from the horn 264.

As a final portion of the system of FIGS. 2a and 2b, it is desirable to provide for a testing of all of the indicator lights on the control panel 10 shown in FIG. 1. This is accomplished through the use of the press-to-test switch 20 shown in FIG. 2a. When the press-to-test switch 20 is closed, terminal 420 of such switch is coupled to the power and is applied through a plurality of resistor diode combinations to all of the indicator lights so as to activate such indicator lights. This may be seen with reference to the lights 96, 98 and 100 through the use of diode resistor combinations 422, 424 and 426. Similar diode resistor combinations 428, 430 and 432 are shown to control the indicator lights 90, 92 and 94. A diode resistor combination 438 is used to control the indicator light 84 which represents element over heat. The room over temperature light 88 is controlled by a diode resistor combination 436 which is coupled to the terminal 420 of the switch 20. The indicator lights 80 and 78 are controlled by diode resistor combinations 438 and 440. The lights 82, 114, and 64 have diode resistor combinations 442, 444, and 446 coupled to the terminal 420 to control these lights to be on when the switch 20 is activated.

All of the demand lights are also controlled to be on through the use of diode resistor combinations 348 through 356 which controls the heat light 68, the cooling light 70 and 72 and the humidity and dehumidity light 66 and 64. The power light 50, of course, is on when power from the line is connected to the circuit and the system on light 52 must come on when the switch 12 is closed. The press-to-test circuit will not work unless the switch 12 is closed. Any auxiliary equipment or optional testing equipment may have similar connections to the press-to-test switch 20 so as to provide for these lights to come on when the switch 20 is pressed.

In the normal operation of the control system and panel of the present invention, the power on light 50 comes on when power is applied from the line. The system on switch is then operated and the light 52 should come on. At this time the temperature setting and the humidity setting may be adjusted to a desired value. This is accomplished by adjusting the arms of the potentiometers 22 and 24 using the screwdriver setting 26 and 28. In order to make sure that all of the indicator lights are operating, the press-to-test switch 20 is operated so that all of the lights will operate. In addition, the alarm will also sound since the alarm sounds when any of the lights are operated in the system. The system is now ready for automatic operation and no further adjustments are necessary. On a periodic basis, it is advisable to switch the changeover switch 16 from one position to another. This equalizes the compressor usage in the system.

If there is a malfunction in the system, a particular light will come on indicating the specific nature of the malfunction and the alarm will sound. It is relatively simple to spot the area of the malfunction since the indicator lights are aligned in a matrix in rows and columns and with the malfunctions of a parituclar piece of equipment being arranged in the same column as indicator light relating to the demand for the operation of that particular piece of equipment.

In regard to the lights showing a particular demand and the fact that a piece of equipment is supplying the demand, it is possible to have more than one light on. For example, if dehumidification is needed, both the dehumidification and the first stage of cooling light will come on since actually the dehumidification is accomplished through the use of cooling. In addition, it is possible that the dehumidification can produce an overcooling so that the system now activates a heating cycle. Therefore, it is possible to have dehumidification, first stage of cooling, and heat, all indicated to be on at the same time.

It can be seen therefore, that the present invention provides a very simple control system and control panel for accurately controlling an air conditioning and heating system. Although the invention has been described with reference to a particular embodiment, the invention is only to be limited by the appended claims.

I claim:

1. A control system for use in monitoring the operation of a plurality of pieces of equipment, including:
   a control panel including,
   a plurality of output indicators and with the output indicators arranged in rows and columns and with individual ones of the indicators in a first row or column providing an indication that individual ones of the pieces of equipment are in an operative state and with individual ones of the indicators arranged in the corresponding columns or corresponding rows providing an indication of a particular malfunction in the operation of the individual ones of the pieces of equipment,
   first means coupled to the individual pieces of equipment and to the individual ones of the indicators in the first row or column for controlling individual ones of the indicators in the first row or column to be on when individual ones of the pieces of equipment are in an operative state,
   second means coupled to the individual pieces of equipment for sensing particular malfunctions in the operation of the individual pieces of equipment and for producing control signals in accordance with such particular malfunctions, and
   third means coupled to the second means and to the individual ones of the indicators in the corresponding columns or corresponding rows and responsive to the control signals for controlling individual ones of the indicators in the corresponding columns or corresponding rows to be on in accordance with the particular malfunctions in the plurality of pieces of equipment.

2. The control system of claim 1 wherein the indicators providing an indication that the pieces of equipment are in an operative state are arranged in a first row and wherein the indicators providing an indication of a malfunction in the operation of the pieces of equipment are arranged in columns and with each column including one indicator from the first row and at least another indicator relating to a particular malfunction of the piece of equipment represented by the indicator in the column.

3. The control system of claim 1 additionally including an audible alarm which alarm provides an audible signal when any of the individual ones of the indicator providing an indication of a particular malfunction is in an operative state.

4. The control system of claim 1 for use in an air conditioning and heating system and with individual ones of the indicators in the first row or column providing an indication that pieces of equipment are providing heating or cooling and with individual ones of the indicators in the corresponding column or corresponding row providing an indication of particular malfunctions in the heating or cooling equipment.

5. The control system of claim 4 additionally including a control adjustment on the control panel for controlling the desired temperature for the heating and air conditioning system to be maintained.

6. The control system of claim 4 additionally including a power switch on the control panel to control the supply of power to the heating and cooling equipment and additionally including an indicator for providing an indication that power is being supplied.

7. The control system of claim 4 additionally including a control adjustment on the control panel for controlling the desired humidity for the heating and air conditioning system to be maintained.

8. An airconditioning and heating control system for controlling the operation of and malfunctions in equipment providing heating and cooling to a given area including;
   a central control panel including a plurality of indicators and a plurality of controllers, and with
   a first controller controlling the application of power to the heating and cooling equipment,
   a first indicator coupled to the first controller for providing an indication of the application of power to the heating and cooling equipment,
   a second controller controlling the supply of heat or cold in accordance with the difference between a desired temperature and the actual temperature in the given area,
   a plurality of second indicators responsive to the operation of the equipment providing the heat or cold for providing an indication that particular ones of the equipment are in an operative state, and
   a plurality of third indicators each responsive to a particular malfunction in the operation of the equipment for providing an indication that particular ones of the equipment has a particular malfunction.

9. The air conditioning and heating control system of claim 8 wherein the plurality of second indicators are arranged in a row on the control panel and the plurality of third indicators are arranged in columns and with each column including individual ones of the second indicators in the row and with the third indicators in each column indicating particular malfunctions in the equipment indicated to be in the operative state by the second indicator in the same column.

10. The air conditioning and heating control system of claim 8 additionally including a third controller controlling the humidity of the given area in accordance with the difference between a desired humidity and the actual humidity in the given area and with a first one of the second indicators providing an indication of dehumidification.

11. The air conditioning and heating control system of claim 8 wherien at least some of the third indicators are arranged in separate groups and wherein each group includes indicators providing indication of different particular malfunctions of the same piece of equipment.

12. The air conditioning and heating control system of claim 8 additionally including means mounted on the control panel to activate all of the second and third indicators to test the operation of the second and third indicators.

13. The air conditioning and heating control system of claim 8 additionally including an audible alarm which is in an operative state when any of the third indicators is in an operative state.

14. The air conditioning and heating control system of claim 13 additionally including means for silencing the audible alarm without affecting the state of operation of the third indicators.

15. A control panel for use in controlling the operation of and indicating malfunctions in a plurality of pieces of equipment, including:
    a first controller mounted on the control panel for use in controlling the operation of individual ones of the pieces of equipment,
    a plurality of first indicators mounted on the control panel and with each first indicator providing an indication of the operation of an individual one of the pieces of equipment,
    a plurality of second indicators mounted on the control panel and with each second indicator providing an indication of a particular malfunction in the operation of an individual one of the pieces of equipment, and
    the combination of the first indicators and the second indicators forming a matrix with the first indicators along a first line in the matrix and with the second indicators along a plurality of second parallel lines perpendicular to the first line.

16. The control panel of claim 15 wherein the second indicators along each parallel line relate to a particular malfunction in the operation of the piece of equipment indicated by each of the first indicator at the intersection between each parallel line and the first line.

17. The control panel of claim 15 additionally including a second controller mounted on the control panel for use in controlling the application of power to the plurality of pieces of equipment and including a third indicator mounted on the control panel and with the third indicator providing an indication that the second controller is controlling the application of power to the plurality of pieces of equipment.

18. The control panel of claim 15 additionally including means to test the panel by placing all of the first and second indicators in an operative state.

19. The control panel of claim 15 for use with an air conditioning and heating system for a given area including individual pieces of equipment for heating and cooling and with the first controller providing a setting of the desired temperature for the given area and with the plurality of first indicators providing an indication of the operation of individual ones of the heating and cooling equipment and with the third indicators providing an indication of particular malfunctions in the operation of the heating and cooling equipment.

20. The control panel of claim 19 additionally including a second controller for providing a setting of the desired humidity for the given area and with the first indicators including indicators providing an indication that the air conditioning and heating system is in a state of humidification or dehumidification.

21. The control panel of claim 19 additionally including an audible alarm for providing an audible indication when any of the third indicators is in an operative state.

22. The control panel of claim 20 additionally including means for silencing the audible alarm without deactivating the third indicators.

* * * * *